US012584323B2

(12) United States Patent
Bale et al.

(10) Patent No.: US 12,584,323 B2
(45) Date of Patent: Mar. 24, 2026

(54) NUT FASTENER AND A FASTENING SYSTEM THEREFOR

(71) Applicant: TURBO SCAFFOLDING PTY LTD, Smithfield (AU)

(72) Inventors: Ravi Gangaram Bale, Bella Vista (AU); Michael Paul Padovan, Hunters Hill (AU)

(73) Assignee: TURBO SCAFFOLDING PTY LTD, Smithfield (AU)

( * ) Notice: Subject to any disclaimer, the term of this patent is extended or adjusted under 35 U.S.C. 154(b) by 841 days.

(21) Appl. No.: 17/782,533

(22) PCT Filed: Nov. 23, 2020

(86) PCT No.: PCT/AU2020/051266
§ 371 (c)(1),
(2) Date: Jun. 3, 2022

(87) PCT Pub. No.: WO2021/108836
PCT Pub. Date: Jun. 10, 2021

(65) Prior Publication Data
US 2023/0034268 A1 Feb. 2, 2023

(30) Foreign Application Priority Data

Dec. 5, 2019 (AU) ................................. 2019904608
Jul. 1, 2020 (AU) ................................. 2020902236

(51) Int. Cl.
*E04G 7/14* (2006.01)
*B25B 13/06* (2006.01)
(Continued)

(52) U.S. Cl.
CPC ................ *E04G 7/14* (2013.01); *B25B 13/06* (2013.01); *F16B 7/0493* (2013.01); *F16B 23/0007* (2013.01); *F16B 39/28* (2013.01)

(58) Field of Classification Search
CPC .... F16B 2/065; F16B 7/0493; F16B 23/0007; F16B 23/0061; F16B 37/042; F16B 39/28;
(Continued)

(56) References Cited

U.S. PATENT DOCUMENTS 3,456,704 A * 7/1969 Johnson ................. B21K 1/707
411/965
3,482,481 A * 12/1969 Newell ................... B25B 13/04
D8/397
(Continued)

FOREIGN PATENT DOCUMENTS

CN 209083787 U 7/2019
GB 943521 A * 12/1963 .......... F16B 23/0061
(Continued)

OTHER PUBLICATIONS

Authorized Officer: Savio Albuquerque, International Preliminary Report on Patentability issued in PCT application No. PCT/AU2020/051266, Jun. 30, 2021, 22 pp.
(Continued)

*Primary Examiner* — Amber R Anderson
*Assistant Examiner* — Kevin J Baynes
(74) *Attorney, Agent, or Firm* — Kaplan Breyer Schwarz, LLP

(57) ABSTRACT

A nut adapted to disengage with a threaded bolt, the nut comprising a base portion integrally formed to a top portion. The nut includes a bore positioned along a central axis through the base portion and the top portion, wherein the top portion is tapered between circumference of the base portion and the bore of the top portion. The tapering is at an angle between 0° to 45° relative to the diameter of the base
(Continued)

portion; the base portion comprises at least two cavities, wherein the at least two cavities extend vertically into the base portion.

20 Claims, 9 Drawing Sheets

(51) Int. Cl.
| | |
|---|---|
| *F16B 7/04* | (2006.01) |
| *F16B 23/00* | (2006.01) |
| *F16B 39/28* | (2006.01) |

(58) Field of Classification Search
CPC ....... B25B 13/06; B25B 13/065; B25B 13/48; E04G 7/12; E04G 7/14; E04G 7/16; Y10T 403/7194
See application file for complete search history.

(56) References Cited

U.S. PATENT DOCUMENTS

| | | | | |
|---|---|---|---|---|
| 3,674,075 A | * | 7/1972 | Hoegee | F16C 7/06 |
| | | | | 411/277 |
| 3,908,489 A | * | 9/1975 | Yamamoto | F16B 23/0061 |
| | | | | 81/186 |
| 4,027,572 A | * | 6/1977 | Burge | B25B 13/485 |
| | | | | 81/461 |
| 4,302,137 A | * | 11/1981 | Hart | F16B 23/0069 |
| | | | | 411/432 |
| 4,361,412 A | * | 11/1982 | Stolarczyk | F16B 23/0007 |
| | | | | 81/119 |
| 4,480,514 A | * | 11/1984 | Ponziani | B25B 15/005 |
| | | | | 81/461 |
| 4,566,819 A | * | 1/1986 | Johnston | E04G 7/16 |
| | | | | 403/385 |
| 4,572,039 A | * | 2/1986 | Desjardins | A47G 3/00 |
| | | | | 411/407 |
| 4,742,702 A | * | 5/1988 | Swertz | F16B 23/0069 |
| | | | | 411/910 |
| 4,748,878 A | * | 6/1988 | Chen | B25B 23/0014 |
| | | | | 81/466 |
| 5,427,465 A | * | 6/1995 | Sato | E04G 7/16 |
| | | | | 403/385 |

| | | | | |
|---|---|---|---|---|
| 6,619,161 B1 | * | 9/2003 | Blair | B25B 13/485 |
| | | | | 81/119 |
| 8,696,418 B1 | * | 4/2014 | Griffin | B64D 13/00 |
| | | | | 454/76 |
| 9,464,660 B2 | * | 10/2016 | Ahdoot | B25B 13/485 |
| 9,689,415 B2 | | 6/2017 | Hutter, III | |
| 9,765,807 B1 | * | 9/2017 | Watts | F16B 23/0007 |
| 9,982,703 B2 | * | 5/2018 | Thomas | F16B 39/103 |
| 2003/0019259 A1 | * | 1/2003 | Nicodemus | B25B 13/485 |
| | | | | 411/910 |
| 2008/0145181 A1 | * | 6/2008 | Lynes | B25B 13/485 |
| | | | | 81/125 |
| 2009/0129887 A1 | * | 5/2009 | Chang | F16B 23/003 |
| | | | | 411/402 |
| 2012/0312130 A1 | * | 12/2012 | Bauer | F16B 23/0015 |
| | | | | 411/407 |
| 2013/0213194 A1 | | 8/2013 | Gerber | |
| 2014/0150612 A1 | | 6/2014 | Cecil | |

FOREIGN PATENT DOCUMENTS

| | | | | | | |
|---|---|---|---|---|---|---|
| GB | | 981681 A | * | 1/1965 | ............. | E04G 7/16 |
| GB | | 1225776 A | * | 3/1971 | ............. | E04G 17/16 |
| GB | | 2384814 A | * | 8/2003 | ............. | E04G 7/14 |
| GB | | 2384815 A | * | 8/2003 | ............. | E04G 7/16 |
| JP | | 2009161938 A | | 7/2009 | | |
| JP | | 2015165154 A | | 9/2015 | | |
| WO | WO-2008001393 A1 | | * | 1/2008 | .......... | B25B 23/105 |
| WO | WO-2010029633 A1 | | * | 3/2010 | .......... | B25B 23/108 |
| WO | WO-2012007127 A1 | | * | 1/2012 | .......... | B25B 13/08 |
| WO | | 2014135835 A1 | | 9/2014 | | |
| WO | | 2014197932 A1 | | 12/2014 | | |
| WO | WO-2016163678 A1 | | * | 10/2016 | ............. | E04G 7/14 |
| WO | WO-2017020067 A1 | | * | 2/2017 | ............. | E04G 5/141 |

OTHER PUBLICATIONS

Authorized Officer: Savio Albuquerque, International Search Report and Written Opinion issued in PCT application No. PCT/AU2020/051266, Feb. 2, 2021, 12 pp.

Authorized Officer: Savio Albuquerque, Written Opinion of the International Preliminary Examining Authority issued in PCT application No. PCT/AU2020/051266, May 5, 2021, 9 pp.

* cited by examiner

SEC A-A

NUT FASTENER AND A FASTENING SYSTEM THEREFOR

TECHNICAL FIELD

The present invention relates to a nut adapted for use with a threaded end of a bolt in which the bolt is used for connecting a clamp half with a central clamp body. More particularly, the present invention may relate to a nut used for securing the threaded end of the bolt to the clamp half, and a device specifically used for providing torque to the nut in placing and securing the threaded end of the bolt to the clamp half.

BACKGROUND

A scaffolding coupler or clamp is a device used to hold two pieces of a scaffolding structure together or hold a piece of scaffolding to a structure. The coupler will be clamped tight to ensure the two tube pieces being connected do not move or slip, and numerous couplers will be used throughout the scaffold structure to complete the finished scaffold in a stable, secure and safe manner. Couplers are always placed in locations at which two or more scaffold tubes or bars come together.

Conventional clamps typically comprise a forged, machine or cast or otherwise fabricated centre piece with two concave recess portions on each side to retain two lengths of scaffolding tube, one on each side of the centre piece, the tubes positioned at right angles. Alternatively, the centre piece may comprise two parts with a centre shaft between them and which can be locked whereby the whole clamp may be rotated to retain two lengths of scaffolding at a different angle to a right angle. This is typically referred to as a swivel coupler. A disadvantage of swivel couplers may be that rotation of parts may contribute to wear and tear of the parts.

Other clamps may have clamp halves which have recesses to clamp lengths of scaffolding tube. These clamp halves are allowed to swing open to allow the scaffolding tube to be inserted into the concave recess created between the clamp halves. Each clamp half is then closed around the tube and secured in place using a screw and nut arrangement, thereby clamping each scaffolding tube into a concave recess. This screw is also typically retained on the centre piece through a hole whereby a recess on the centre piece prevents the screw rotating. A nut is typically retained on the screw. The nut is tightened upon closure of the clamp half on the scaffolding tube as part of the assembly of the scaffolding system by the operator, using a ratchet or socket wrench or other tool. A disadvantage with of this type of nuts is that common tools are able to grip to loosen or tighten the nut to the screw. As common tools can be used to loosen, detachable nuts that secure the screw to the clamp half can be easily pilfered or stolen.

For example, Published PCT Patent Application No. WO2014135835 describes a scaffolding clamp that may have a bespoke shape in particular a nut used to tighten the assembly such that a reciprocally shaped tool is required for operation. The nut itself can be adapted, for example to improve security by using a special shaped external or internal profile, to improve ease of use and also to improve security. Security can be enabled by using a nut profile (internal or external) that is not in common use so a bespoke or specialist tool is required for operation and scaffolding assembly. A disadvantage of this screw and nut combination is that the fastener assembly should not be separable which could cause one or more parts to become detached from the scaffolding clamp. Those parts may disadvantageously hinder the placement of the scaffolding tube to the clamp. Additionally, the shape and configuration of the nut may allow for improvised tools to remove the nut (such mini vise grips or pliers).

Any discussion of the prior art throughout the specification should in no way be considered as an admission that such prior art is widely known or forms part of common general knowledge in the field.

SUMMARY

Problems to be Solved

It may be an advantage to provide a detachable nut and threaded bolt combination so that one or more parts can become detached from the scaffolding clamp to facilitate unhindered connection of the beams to the scaffolding clamp.

It may be an advantage to provide a linear tapered conical shaped nut, in which the tapered conical portion of the nut is smooth such that common tools can easily slip from the nut when attempting to turn the nut.

It may be an advantage to provide a base portion of the nut that fits flush with the clamp recess so as to secure the threaded bolt with the clamp half as well as reducing the access at which common tools can grip to turn the nut.

It may be an advantage to provide cavities vertically through the top portion of the nut so as to allow a tool designed specifically for use with the nut, in which the tool have male portions which engage the cavities of the nut to allow the user to provide torque to the nut ergonomically when using the tool.

It may be an advantage to provide cavities vertically into or through the base portion of the nut so as to allow a tool designed specifically for use with the nut, in which the tool have male portions which engage the cavities of the nut to allow the user to provide torque to the nut ergonomically when using the tool.

It may be an advantage to provide a gap between the tool and the base portion of the nut when the male portions of the tool are engaging with the cavities of the top portion of the nut so that the tool reduces being stuck with the nut when the tool is being disengaged.

It may be an advantage to provide a tool with a pivotable handle so that the tool allows the user to provide torque to the nut ergonomically when using the tool.

It is an object of the present invention to overcome or ameliorate at least one of the disadvantages of the prior art, or to provide a useful alternative.

Means for Solving the Problem

A first aspect of the present invention may relate to a nut adapted to disengage with a threaded bolt, the nut comprising a base portion integrally formed to a top portion, wherein the nut includes a bore positioned along a central axis through the base portion and the top portion, wherein the top portion is tapered between circumference of the base portion and the bore of the top portion, wherein the tapering is at an angle between 0 to 45° relative to the diameter of the base portion. The tapered region comprises at least two cavities, wherein the at least two cavities extend vertically through the tapered top portion.

Preferably, the tapered surface between each cavity is smooth, and wherein the tapered surface is linear.

Preferably, each cavity extends vertically through the tapered top portion to the base portion.

Preferably, the number of cavities of the at least two cavities is three.

Preferably, each of the cavities are equally spaced relative to each other around the tapered top portion.

Preferably, each of the cavities are asymmetrically spaced relative to each other around the tapered top portion.

Preferably, the base portion is adapted to be received in a first recess of a first clamp arm, wherein the first recess covers the base portion.

Preferably, the base portion is flush with the first recess.

Preferably, the tapered top portion is exposed when the base portion is received in the recess.

Preferably, the profile of each cavity is a trapezoidal shape.

Preferably, the nut is formed from black steel and/or galvanised steel.

A second aspect of the present invention may relate to a nut adapted to disengage with a threaded bolt, the nut comprising a base portion integrally formed to a top portion, wherein the nut includes a bore positioned along a central axis through the base portion and the top portion, wherein the top portion is tapered between circumference of the base portion and the bore of the top portion, wherein the tapering is at an angle between 0 to 45° relative to the diameter of the base portion. The base portion comprises at least two cavities, wherein the at least two cavities extend vertically into the base portion.

Preferably, the tapered surface between each cavity is smooth, and wherein the tapered surface is linear.

Preferably, each cavity extends vertically through the base portion.

Preferably, the number of cavities of the at least two cavities is three.

Preferably, each of the cavities are equally spaced relative to each other around the base portion.

Preferably, the base portion is adapted to be received in a first recess of a first clamp arm, wherein the first recess covers the base portion.

Preferably, the base portion is flush with the first recess.

Preferably, the tapered top portion is exposed when the base portion is received in the recess.

Preferably, the nut is formed from black steel and/or galvanised steel.

Preferably, the cavities each have a wall that is curved towards the bore, wherein the curved cavity wall is parallel to the longitudinal axis of the bore.

Preferably, the shape of the cavity and the shape of the adjacent cavity have a reflection symmetry with respect to the diameter of the base portion equidistant between each other.

Preferably, the nut is engageable with a device, the device comprising an elongate member having a proximal end and a distal end and a chamber extending from the proximal end and the distal end; the proximal end having at least two male portions mounted to the inner surface of the elongate member, wherein each of the at least two male portions extend parallel to the longitudinal axis of the elongate member such that each of the at least two male portions extend beyond the proximal end, wherein each of the male portions is adapted to receive in a different cavity of the nut, and wherein the chamber is adapted to receive the top portion of the nut.

Preferably, the male portion is received in the different cavity of the nut, the proximal end of the elongate member does not engage with the base portion of the nut, when in use.

Preferably, the chamber of the device is adapted to receive the thread of the bolt, when the thread of the bolt extends out from the bore of the top portion as the nut moves towards the head of the bolt.

Preferably, the distal end of the elongate member is pivotally connected to a handle, wherein the handle can pivotally move between −90° to 90° with respect to longitudinal axis of the elongate member.

Preferably, the profile of each of the male portions is a trapezoidal shape.

Preferably, the nut is engageable with a device, the device comprising an elongate member having a proximal end and a distal end and a chamber extending from the proximal end and the distal end; the proximal end having at least two male portions mounted to the wall of the chamber, wherein each of the at least two male portions extend parallel to the longitudinal axis of the elongate member, wherein each of the male portions is adapted to receive in a different cavity of the nut, and wherein the chamber is adapted to receive the top portion of the nut.

Preferably, the male portion is received in the different cavity of the nut, the proximal end of the elongate member does not engage with the base portion of the nut, when in use.

Preferably, the chamber of the device is adapted to receive the thread of the bolt, when the thread of the bolt extends out from the bore of the top portion as the nut moves towards the head of the bolt.

Preferably, the distal end of the elongate member is pivotally connected to a handle, wherein the handle can pivotally move between −90° to 90° with respect to longitudinal axis of the elongate member.

Preferably, a scaffolding clamp adapted for securing a first and a second beam using the nut, the scaffolding clamp comprising a first arm joined with a second arm forming a central X-shaped body, wherein the central body has an upper surface and a lower surface. The first arm comprising a first pivot at one end, a first bolt head retainer at the other end, and a first concave recess positioned at the upper surface between the first pivot and the first aperture, wherein the first concave recess is perpendicular to the longitudinal axis of the first arm. The second arm comprising a second pivot at one end, a second bolt retainer at the other end, and a second concave recess positioned at the lower surface between the second pivot and the second aperture, wherein the second concave recess is perpendicular to the longitudinal axis of the second arm. A first clamp half at one end pivotally engaging with the first pivot, and the first clamp half at the other end adapted to secure the first threaded bolt with the nut. A second clamp half at one end pivotally engaging with the second pivot, and the second clamp half at the other end adapted to secure a second bolt with a second nut, wherein the second nut is adapted to disengage with the second threaded bolt.

Preferably, the first bolt retainer comprise a first aperture positioned at the upper surface of the first arm, and a first bolt recess positioned at the lower surface of the first arm, wherein the first aperture is adapted for receiving the first bolt, and wherein the first bolt recess is adapted for securing the head of the first bolt.

Preferably, the second bolt retainer comprise a second aperture positioned at the lower surface of the second arm, and a second bolt recess positioned at the upper surface of the second arm, wherein the second aperture is adapted for receiving the second bolt, and wherein the second bolt recess is adapted for securing the head of the second bolt.

Preferably, the head of the first and second threaded bolts are T-shaped.

Preferably, the second nut is one selected from the group of: the first nut, and a hex nut.

Preferably, the second bolt securing end of the second clamp half has a second concave recess adapted for receiving the base portion of the second nut.

Preferably, the second concave recess wherein the base portion of the second nut is adapted to be received in a second recess of the second clamp half, wherein the second recess covers the base portion of the second nut.

Preferably, the base portion of the second nut is flush with the second recess.

Preferably, the scaffolding clamp is constructed from black steel and/or galvanised steel.

Preferably, the pivotal movement of the first clamp half allows movement outwardly away from the first concave recess of the central body through an angle greater than 90° for allowing placement of the first beam transversely of the length of the first beam.

Preferably, the pivotal movement of the second clamp half allows movement outwardly away from the second concave recess of the central body through an angle greater than 90° for allowing placement of the second beam transversely of the length of the second beam.

In the context of the present invention, the words "comprise", "comprising" and the like are to be construed in their inclusive, as opposed to their exclusive, sense, that is in the sense of "including, but not limited to".

The invention is to be interpreted with reference to the at least one of the technical problems described or affiliated with the background art. The present aims to solve or ameliorate at least one of the technical problems and this may result in one or more advantageous effects as defined by this specification and described in detail with reference to the preferred embodiments of the present invention.

DESCRIPTION OF THE INVENTION

Preferred embodiments of the present invention will now be described with reference to the accompanying drawings and non-limiting examples.

Figure 6:
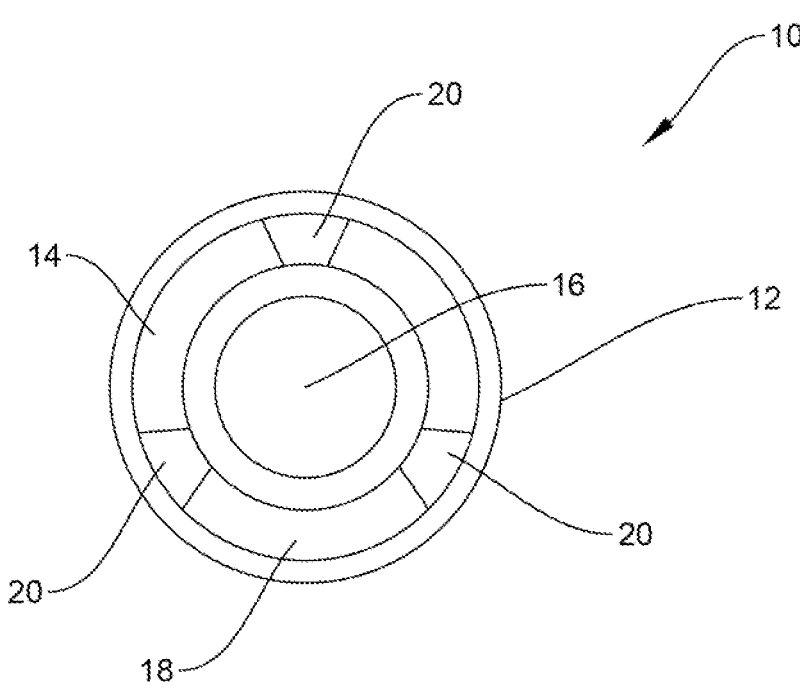
FIG. 6 depicts a top view of the nut of the preferred embodiment.
Figure 7:
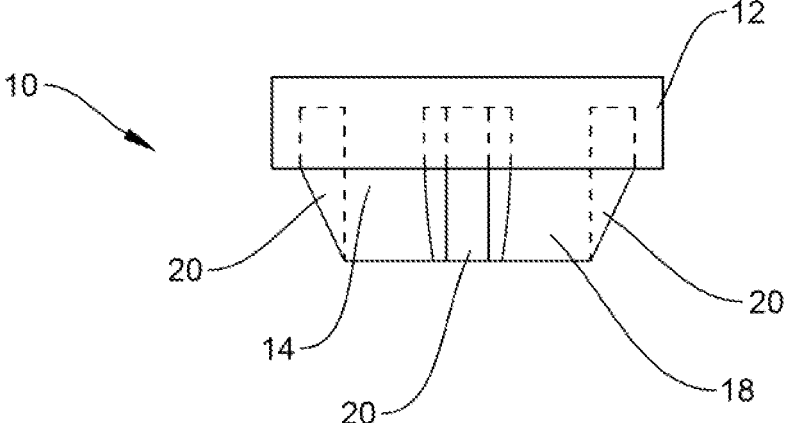
FIG. 7 depicts a side view of the nut of FIG. 6.

In a first preferred embodiment of the present invention, as illustrated in FIGS. 6 and 7, FIG. 6 shows a nut 10 according to a preferred embodiment of the present invention. The nut 10 may be adapted to disengage with a threaded bolt, the nut may comprise a base portion or a washer portion 12 integrally formed to a top portion 14. The base portion or a washer portion 12 may be a curved shape or a circular shape. The nut 10 may include a bore 16 positioned along a central axis through the base portion 12 and the top portion 14. The bore 16 may be a circular shape which may have a threaded portion (not shown) allowing for the engagement with the threaded portion of the threaded bolt. The top portion 14 may be tapered between the circumference of the base portion 12 and the bore 16 of the top portion 14. The nut 10 may be a tapered conical shape. The tapering of the top portion 14 may be substantially steep and may be at an angle between 0 to 45° relative to the diameter of the base portion 12. The tapered region 18 may comprise at least two cavities 20, wherein the at least two cavities 20 may extend vertically through the tapered top portion 14. Preferably, the at least two cavities 20 may extend vertically through the tapered top portion 14 partially into the base portion 12, as shown in FIG. 7.

Figures 1, 2, 3, 4, 5:
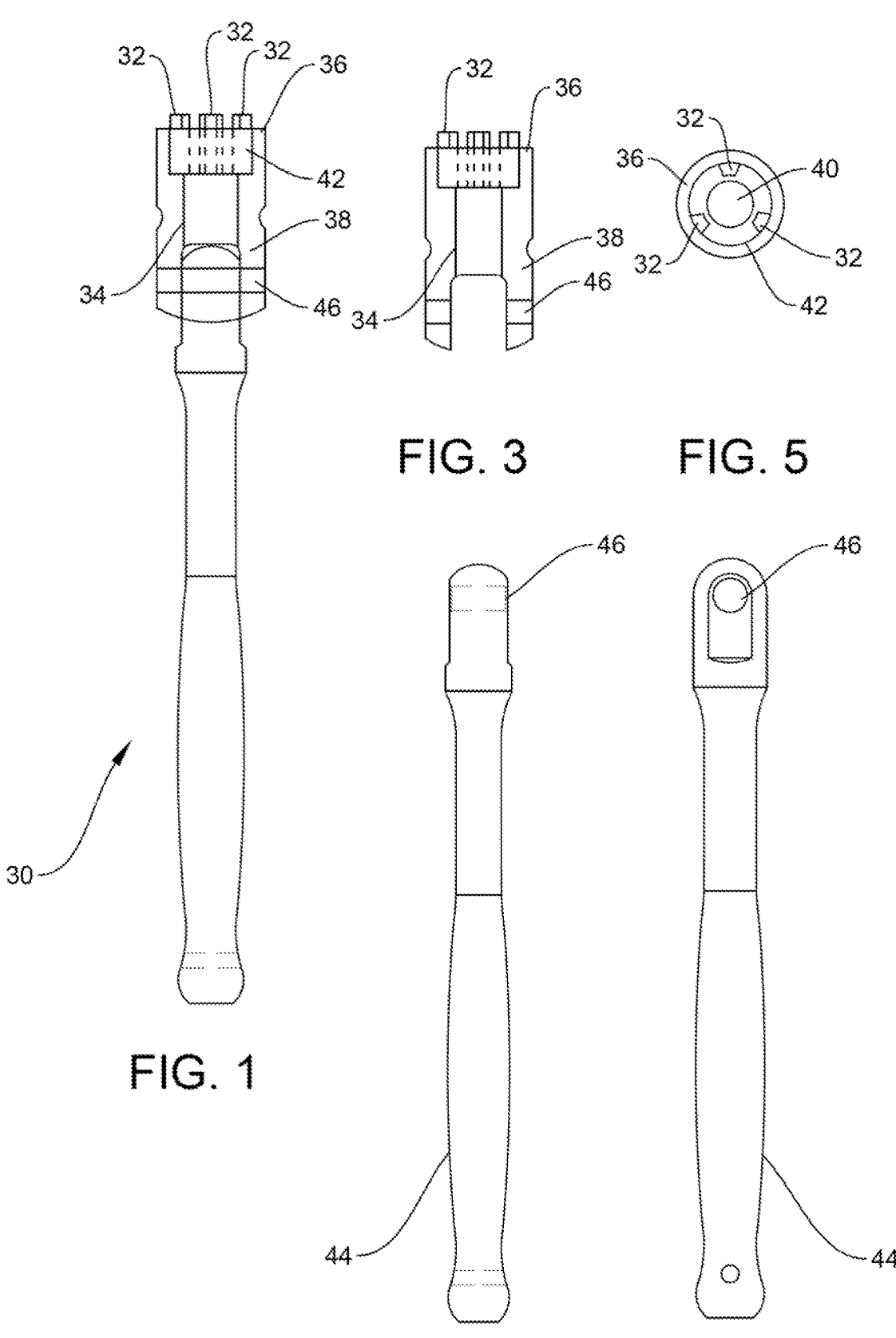
FIG. 1 depicts a side view of the connected device for use with a nut with a first preferred embodiment of the present invention.
FIG. 2 depicts a side view of the handle when it has been detached from the head of the device for use with the nut of the first preferred embodiment.
FIG. 3 depicts a side view of the head of the device when the head has been detached from the handle.
FIG. 4 depicts another side view of the handle of FIG. 2 showing the pivotal connection to the head of the device.
FIG. 5 depicts a top view of the head of the device of FIG. 3 showing the bore and the positioning of the male portions for use with the nut of a preferred embodiment.

As shown in FIG. 6, the tapered surface or tapered region 18 between each cavity 20 may be smooth. Preferably, the tapered surface 18 of the top portion 12 may be linear so that common tools generally used turning hex nuts may not easily grip the tapered top portion 14 for providing torque to the nut 10. The bespoke nut 10 may preferably have three cavities. It may be appreciated that the cavities 20 may be any number greater than two so that the bespoke tool 30, as shown in FIG. 1, may allow a user to provide torque to the bespoke nut 10 when each of the male portions 32 of the bespoke tool is each engaging with different cavities 20 of the nut 10. Preferably, the bespoke tool 30 is ergonomically shaped to conform with the shape of the user's hands.

The bespoke nut 10 may have cavities that may be equally spaced relative to each other around the tapered top portion 14. In another embodiment (not shown), the bespoke nut 10 may have cavities that may be asymmetrically spaced relative to each other around the tapered top portion 14. This is so that a specific tool can be suitably used to engage or disengage the nut 10 from the threaded bolt. This specificness of the tool 30 to be used with the nut 10 may provide a more secure fastener assembly with the threaded bolt, in which the nut 10 may not be removed by ordinary and common nut turning tools.

Figure 8:
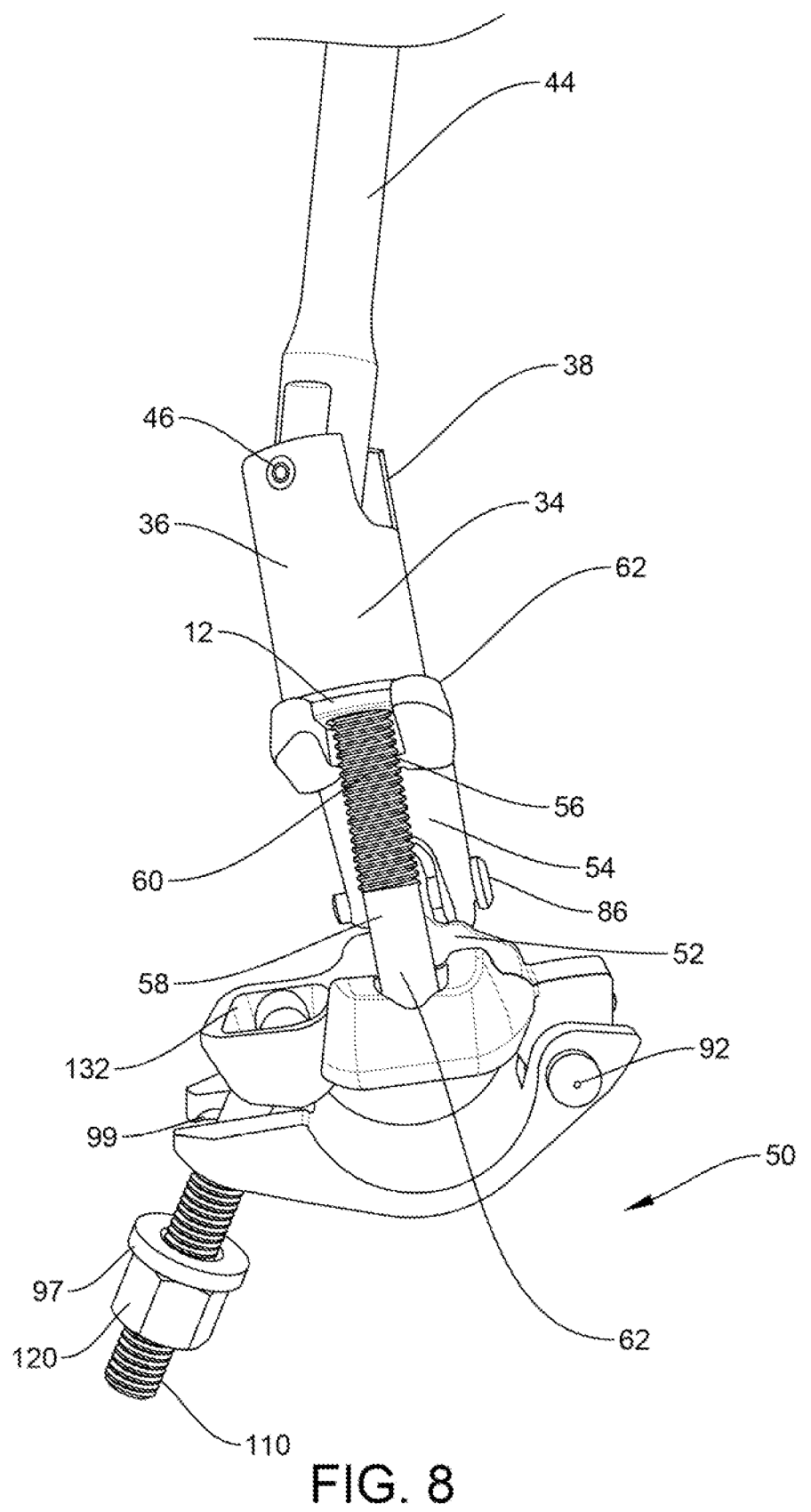
FIG. 8 depicts the nut of FIG. 6 engaging with a threaded bolt and received in the recess of a clamp half in which the tool of FIG. 1 is in use with the nut.
Figure 9:
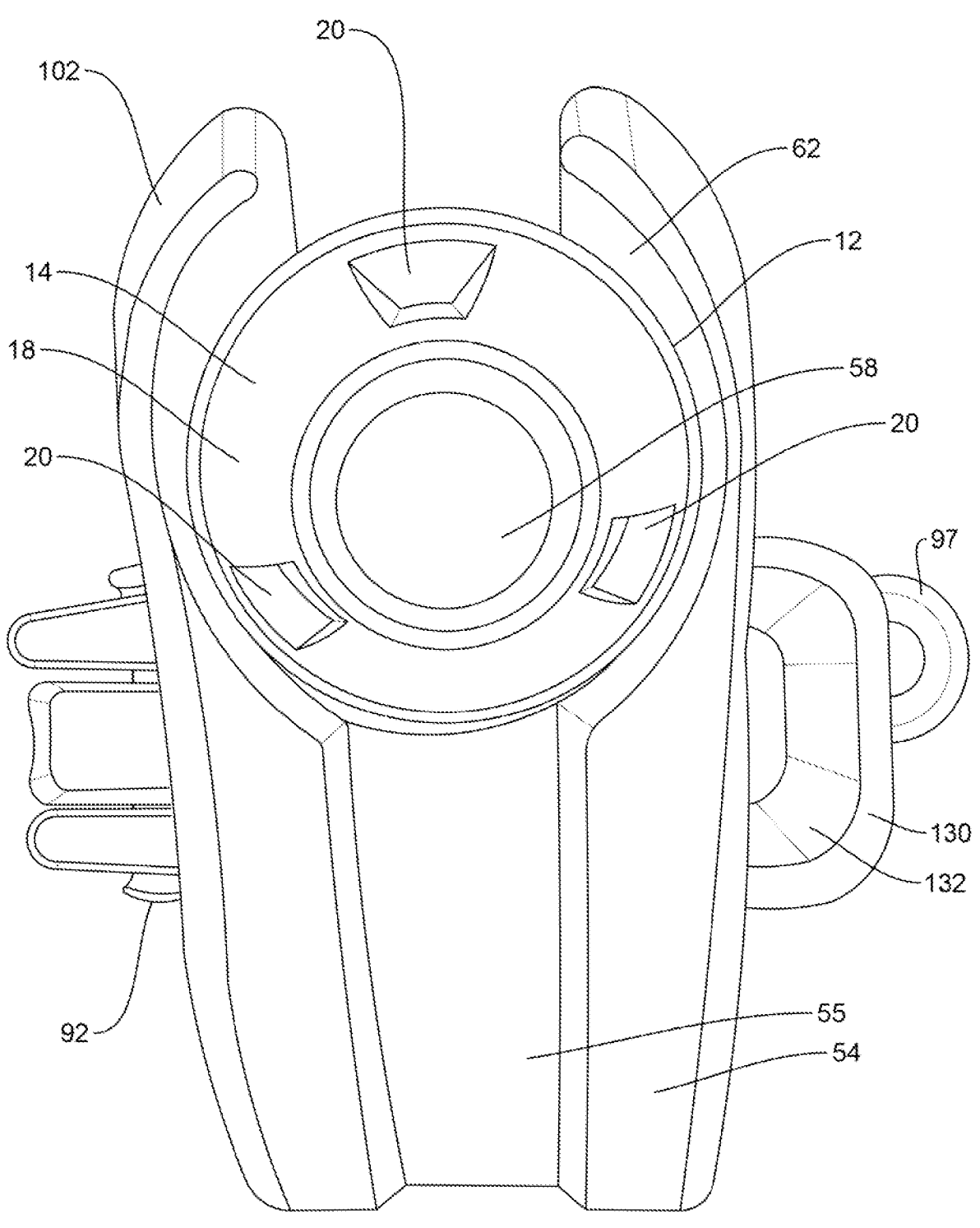
FIG. 9 depicts a top view of the nut of FIG. 6 received in the recess of the clamp half of the clamp of FIG. 8.
Figure 10:
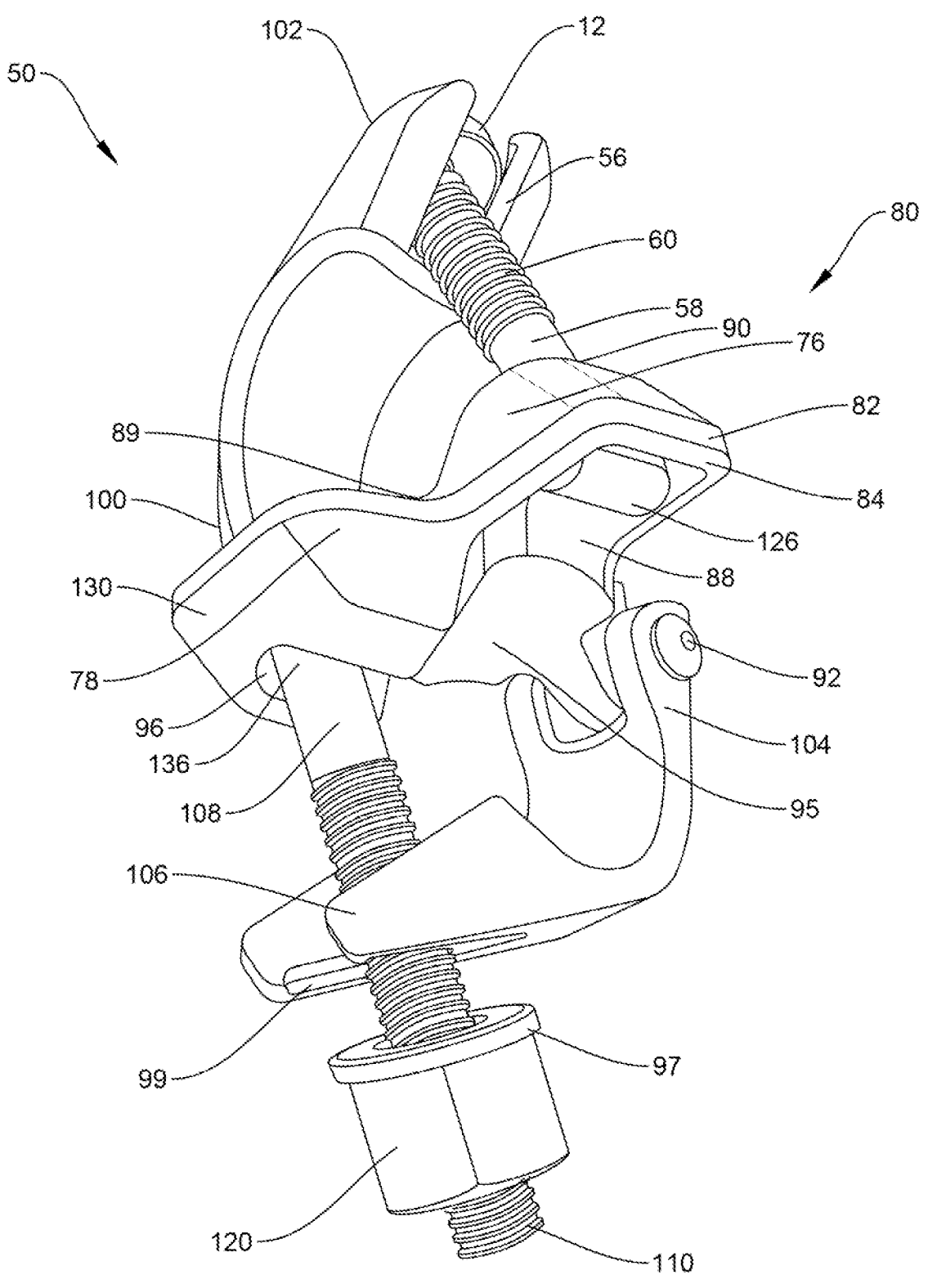
FIG. 10 depicts a perspective view of the nut of FIG. 6 received in the recess of the upper clamp half while a different nut is received in another recess of the lower clamp half.

This more secure bespoke nut 10 and bespoke tool 30 fastener assembly may be adapted to be used with a clamp 50 to fasten a first clamp half 54 with a clamp body 52 as shown in FIG. 8 and FIG. 10. The first clamp half 54 may have a first threaded bolt receiving means 56 adapted to receive the threaded end 60 of the first threaded bolt 58. The first clamp half 54 may also have a concave recess 62 at the outer surface 55 of the first clamp half, the concave recess 62 may be adapted for receiving the base portion 12 of the nut 10. The concave recess 62 of the clamp half may have a depth that covers the height of the base portion 12 of the nut 10 when received. Preferably, the base portion 12 may be flush with the concave recess 62 with the tapered top portion 14 of the nut 10 exposed. The exposure of the tapered top portion 14 may allow for engagement with the bespoke tool 30. The tapered top portion 14 also prevents or limits the capability of the user to use other workshop tools to disengage the locking nut 10 without the use of the bespoke tool 30. Other workshop tools including mini-vice grips, pliers, and wrenches will not be to engage either the tapered surface or the circular rounded top profile of the locking nut 10.

Each cavity 20 of the nut 10 may each have a profile of a trapezoidal shape. It may be appreciated that other shapes can be used as long as the bespoke tool 30 have the same shape to fit into each of the cavities of the bespoke nut 10. The bespoke nut 10 may be formed from black steel and/or galvanised steel. The trapezoidal shape is keyed to mate with the corresponding extension of the bespoke tool 30.

The device or tool 30 may be adapted for engaging with the nut 10. As shown in FIGS. 1 to 5, the device or tool 30 may comprise an elongate member or head 34. The elongate member or head 34 may have a proximal end 36 and a distal end 38 and a chamber or bore 40 extending from the proximal end 36 and the distal end 38. The proximal end 36 may have at least two male portions 32 mounted to the inner surface 42 of the elongate member 34. Each of the at least two male portion 32 may extend parallel to the longitudinal axis of the elongate member 34 such that each of the at least two male portions may extend or protrude beyond the proximal end 36, wherein each of the male portions 32 is adapted to receive in a different cavity 20 of the nut 10 and wherein the chamber or bore 40 is adapted to receive the top portion 14 of the nut 10. Preferably, each of the male portion 32 is received in the different cavity 20 of the nut 10, wherein the proximal end of the elongate member 36 does not engage with the base portion 12 of the nut 10, when in use.

When the nut 10 is engaged with the threaded end 60 of the threaded bolt 58, the chamber bore 40 of the device or tool 30 may be adapted to receive the threaded end 60, when the threaded end 60 of the bolt 58 extends out from the bore 16 of the top portion 14 as the nut moves towards the head 62 of the bolt 58. Preferably, the bolt may be a T-shaped bolt.

The elongate member 34 may have a distal end 38, wherein the distal end 38 may have a pivoting means 46 or pivotally connected to a handle 44. The pivotal connection may allow the handle to pivotally move between −90° to 90° with respect to the longitudinal axis of the elongate member 34. Although a user can impart a turning motion to the handle when it is along the longitudinal axis of the elongate member 34 to turn the nut 10, when the tool 30 is engaged with the nut 10; it may be ergonomically better for the user to pivotally move the handle 44 either −90° or 90° with respect to the longitudinal axis of the elongate member 34 so that the user can use their body weight to apply torque to the nut 10.

Figure 12A:
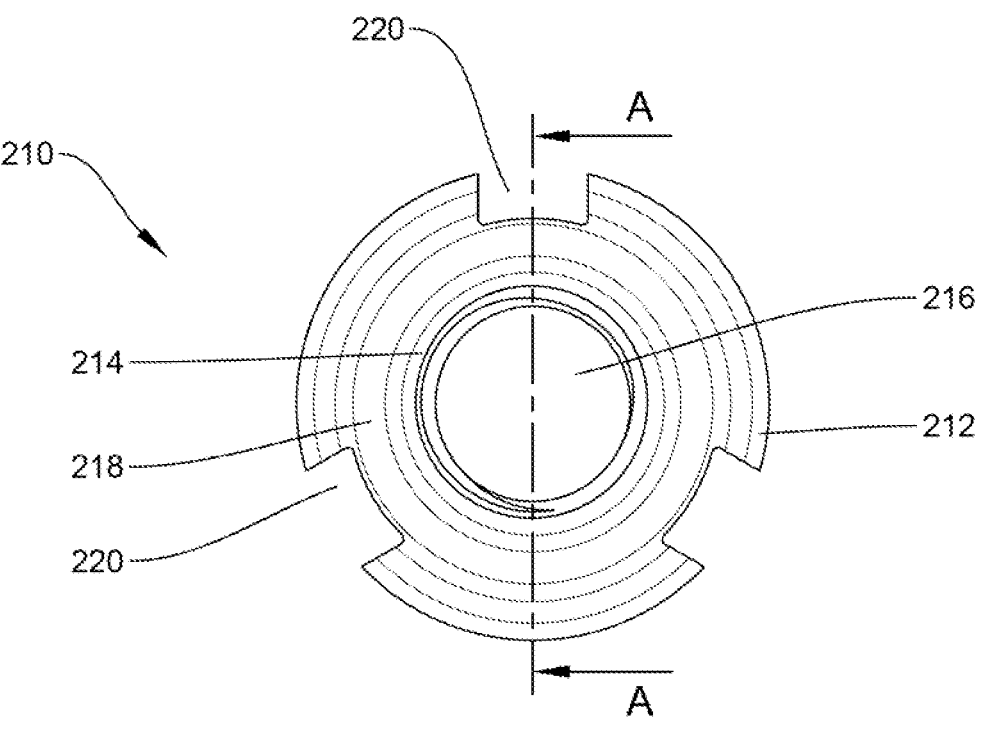
FIG. 12A depicts a top view of a nut of another preferred embodiment.
Figure 12B:
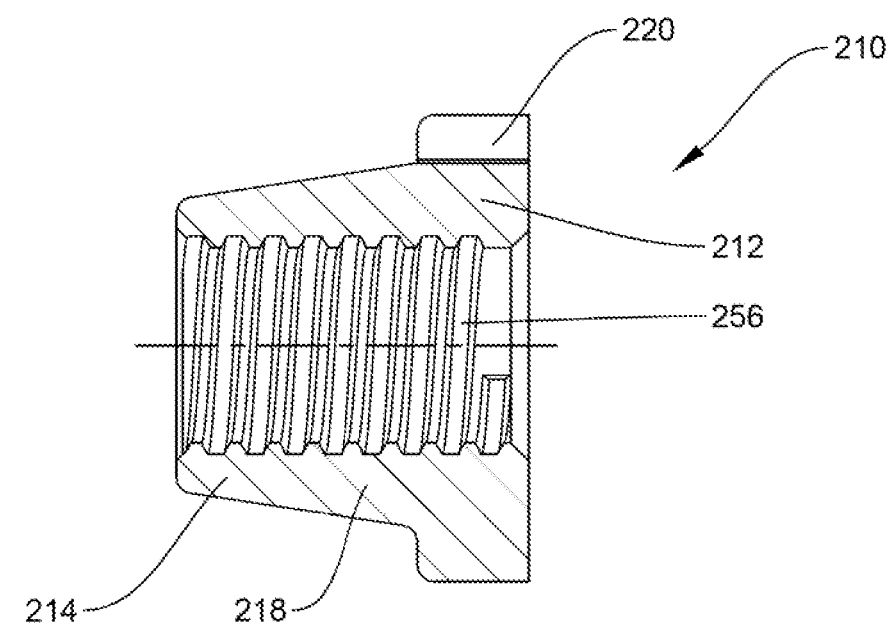
FIG. 12B depicts a side cross-sectional view of the nut of FIG. 12A along A-A.

In another preferred embodiment of the present invention, as illustrated in FIGS. 12A and 12B, FIG. 12 shows a nut 210 according to another preferred embodiment of the present invention. The nut 210 may be adapted to disengage with a threaded bolt, the nut 210 may comprise a base portion or a washer portion 212 integrally formed to a top portion 214. The base portion or a washer portion 212 may be a curved shape or a circular shape. The nut 210 may include a bore 216 positioned along a central axis through the base portion 212 and the top portion 214. The bore 216 may be a circular shape which may have a threaded portion 256, as shown in FIG. 12B, allowing for the engagement with the threaded portion of the threaded bolt. The top portion 214 may be tapered between the circumference of the base portion 212 and the bore 216 of the top portion 214. The nut 210 may be a tapered conical shape. The tapering of the top portion 214 may be substantially steep and may be at an angle between 0 to 45° relative to the diameter of the base portion 212. The base portion 212 may comprise at least two cavities 220, wherein the at least two cavities 220 may extend vertically into the base portion 212. Preferably, the at least two cavities 220 may extend vertically through the base portion 212, as shown in FIG. 12A.

As shown in FIG. 12A, the tapered surface or tapered region 218 between each cavity 220 may be smooth. Preferably, the tapered surface 218 of the top portion 212 may be linear so that common tools generally used turning hex nuts may not easily grip the tapered top portion 214 for providing torque to the nut 210. The bespoke nut 210 may preferably have three cavities. It may be appreciated that the cavities 220 may be any number greater than two so that a bespoke tool, may allow a user to provide torque to the bespoke nut 210 when each of the male portions of the bespoke tool is each engaging with different cavities 220 of the nut 210. Preferably, the bespoke tool is ergonomically shaped to conform with the shape of the user's hands.

The bespoke nut 210 may have cavities that may be equally spaced relative to each other around the tapered top portion 214. In another embodiment (not shown), the bespoke nut 210 may have cavities that may be asymmetrically spaced relative to each other around the tapered top portion 214. This is so that a specific tool can be suitably used to engage or disengage the nut 210 from the threaded bolt. This specificness of the tool to be used with the nut 210 may provide a more secure fastener assembly with the threaded bolt, in which the nut 210 may not be removed by ordinary and common nut turning tools.

This more secure bespoke nut 210 and bespoke tool fastener assembly may be adapted to be used with a clamp 50 to fasten a first clamp half 54 with a clamp body 52 as shown in FIG. 8 and FIG. 10. The first clamp half 54 may have a first threaded bolt receiving means 56 adapted to receive the threaded end 60 of the first threaded bolt 58. The first clamp half 54 may also have a concave recess 62 at the outer surface 55 of the first clamp half, the concave recess 62 may be adapted for receiving the base portion 12 of the nut 210. The concave recess 62 of the clamp half may have a depth that covers the height of the base portion 212 of the nut 210 when received. Preferably, the base portion 212 may be flush with the concave recess 62 with the tapered top portion 214 of the nut 210 exposed. The exposure of the tapered top portion 214 may allow for engagement with the bespoke tool. The tapered top portion 214 also prevents or limits the capability of the user to use other workshop tools to disengage the locking nut 210 without the use of the bespoke tool. Other workshop tools including mini-vice grips, pliers, and wrenches will not be to engage either the tapered surface or the circular rounded top profile of the locking nut 210.

Each cavity 220 of the nut 210 may each have a profile similar to a rounded rectangle with a concave edge as depicted in FIG. 12A. It may be appreciated that other shapes can be used as long as the bespoke tool have the same shape to fit into each of the cavities of the bespoke nut 210. The bespoke nut 210 may be formed from black steel and/or galvanised steel. The shape is keyed to mate with the corresponding extension of the bespoke tool.

The device or tool may be adapted for engaging with the nut 210. the device or tool may comprise an elongate member or head. The elongate member or head may have a proximal end and a distal end and a bore extending from the proximal end and the distal end. The proximal end may have at least two male portions mounted to the circumference of the elongate member. Each of the at least two male portion may extend parallel to the longitudinal axis of the elongate member such that each of the at least two male portions may extend or protrude beyond the proximal end, wherein each of the male portions is adapted to receive in a different cavity 220 of the nut 210 and wherein the bore is adapted to receive the top portion 214 of the nut 210. Preferably, each of the male portion is received in the different cavity 220 of the nut 210, wherein the proximal end of the elongate member does not engage with the base portion or washer portion 212 of the nut 210, when in use.

When the nut 210 is engaged with the threaded end 60 of the threaded bolt 58, the bore of the device or tool may be adapted to receive the threaded end 60, when the threaded end 60 of the bolt 58 extends out from the bore 216 of the top portion 214 as the nut 210 moves towards the head 62 of the bolt 58. Preferably, the bolt may be a T-shaped bolt.

The elongate member may have a distal end, wherein the distal end may have a pivoting means or pivotally connected to a handle. The pivotal connection may allow the handle to pivotally move between −90° to 90° with respect to the longitudinal axis of the elongate member. Although a user can impart a turning motion to the handle when it is along the longitudinal axis of the elongate member to turn the nut 210, when the tool is engaged with the nut 210; it may be ergonomically better for the user to pivotally move the handle either −90° or 90° with respect to the longitudinal axis of the elongate member 34 so that the user can use their body weight to apply torque to the nut 210.

Figure 11:
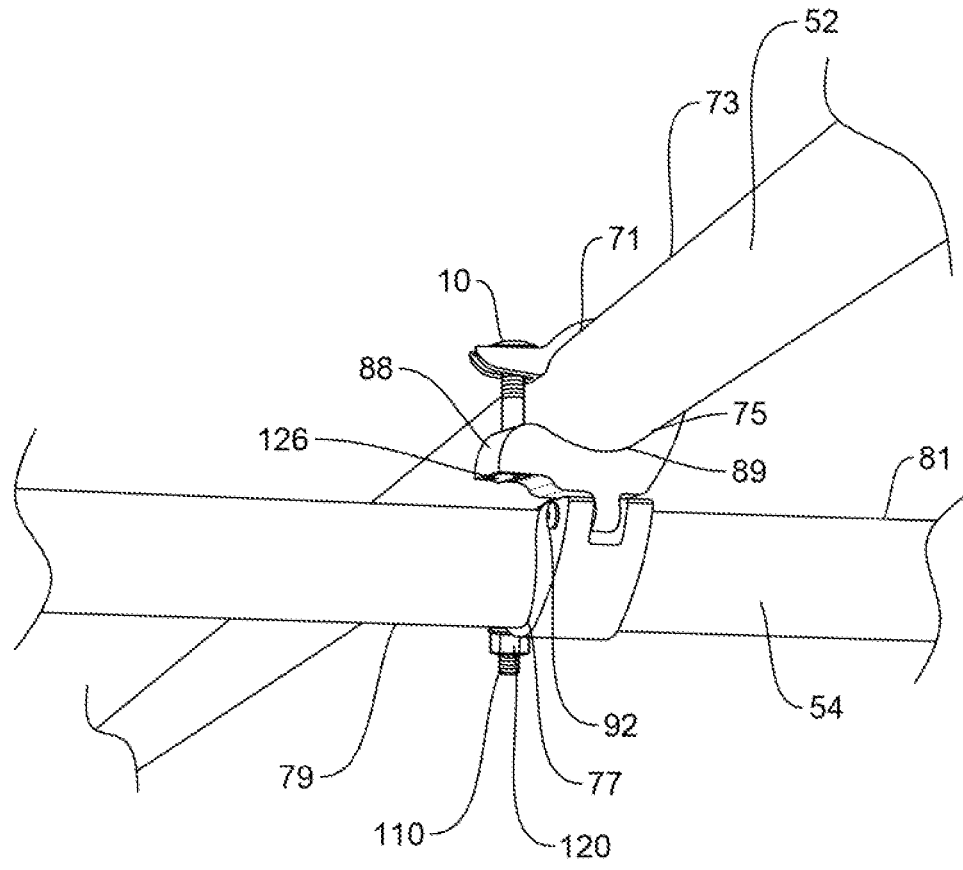
FIG. 11 depicts a perspective view of the clamps in use, in which the clamps uses the nut of FIG. 6 secures the thread bolt to the clamp half.

As shown in FIG. 11, a scaffolding clamp 50 may be adapted for securing a first beam 51 and a second beam 53. The scaffolding clamp may have two clamp halves. At least one half or side of the clamp may use the nut 10 or nut 210 of the preferred embodiment. The scaffolding clamp 50 may comprise a first arm 76 joined with a second arm 78 to form a central X-shaped body 80. The central X-shaped body 80 may have an upper surface 82 and a lower surface 84. The preferred configuration is to use two locking nuts 10 or two locking nuts 210 wherein one is mounted on each half of the scaffolding clamp 50.

As illustrated in FIG. 10, the first arm 76 may comprise a first pivot 86 at one end 85, a first bolt head retainer 88 at the other end 87, and a first concave recess 89 positioned at the upper surface 82 between the first pivot 86 and a first aperture 90, wherein the first concave recess 89 may be perpendicular to the longitudinal axis of the first arm 76. The second arm 78 may comprise a second pivot 92 at one end 91, a second bolt retainer 94 at the other end 93, and a second concave recess 95 positioned at the lower surface 84 between the second pivot 92 and a second aperture 96, wherein the second concave recess 95 may be perpendicular to the longitudinal axis of the second arm 78.

A first clamp half at one end 100 pivotally engaging with the first pivot 86, and the first clamp half at the other end 102 adapted to secure the first threaded bolt 58 with the nut 10 or nut 210. Similarly, a second clamp half at one end 104 pivotally engaging with the second pivot 92, and the second clamp half at the other end 106 adapted to secure a second threaded bolt 108 with a second nut 120, wherein the second nut 120 may be adapted to disengage with the second threaded bolt 108. The second nut may be similar to nut 10 or nut 210 with a threaded bore (not shown) that is adapted to engage with the second threaded end 110 of the second threaded bolt 108.

The first bolt retainer 88 may comprise the first aperture 90 positioned at the upper surface 82 of the first arm 76, and a first bolt recess 122 positioned at the lower surface 84 of the first arm 76, wherein the first aperture 90 may be adapted for receiving a head portion 124 of the first bolt 58, and wherein the first bolt recess 122 may be adapted for securing the head 126 of the first bolt. The head 126 of the first bolt may be the top part of the T-shape and the head portion 124 of the first bolt may be between the top part of the T-shape and the elongate threaded portion of the first bolt.

As shown in FIG. 10, the first clamp is in a secured configuration when the head or top part of the T-shape bolt 126 is received in the first bolt retainer 88 and the dis-engageable nut 10 or dis-engageable nut 210 is engaging the threaded end of the bolt while sitting in the concave recess of the first clamp half. The secured configuration of the first clamp can be loosened or tightened by adjusting the nut position along the threaded portion of the first bolt. The secured nut position at the threaded portion near the tail end of the T-shaped bolt will allow for larger diameter scaffolding tubes or larger beams to be clamped by the first clamp. While the secured nut position at the threaded portion near the head end of the T-shaped bolt will allow for smaller diameter scaffolding tubes or smaller beams to be clamped by the first clamp. As shown in FIG. 11, it is appreciated that the lower surface 71 of the first clamp half may be concave so that the upper curved surface 73 of the first scaffolding tube 52 is engaging with the lower concave surface 75 of the first clamp half and the lower curved surface 75 of the first scaffolding tube 52 is engaging with the concave surface of the first arm of the central X-shaped body.

Similarly, the second bolt retainer 130 may comprise a second aperture 96 positioned at the lower surface 84 of the second arm 78, and a second bolt recess 132 positioned at the upper surface 82 of the second arm 78. The second aperture 96 may be adapted for receiving the second bolt 108, and wherein the second bolt recess 132 may be adapted for securing the head 134 of the second bolt. Similarly, the head 134 of the second bolt may be the top part of the T-shape and the head portion 136 of the second bolt may be between the top part of the T-shape and the elongate threaded portion 110 of the second bolt 108.

As shown in FIG. 10, the second clamp is in a secured configuration when the head or top part of the second T-shape bolt 108 is received in the second bolt retainer 130 and the second disengageable nut may be engaging the threaded end of the bolt 110 while sitting in the concave recess of the second clamp half. The second disengageable nut may be the same first disengageable nut 10 or nut 210 or a different nut. For illustrative purposes, an example of a different second nut used is shown in FIG. 10, where a hex nut is used. Preferably, the same first disengageable nut 10 or nut 210 is used for the second nut for better clamp securing. The secured configuration of the second clamp can be loosened or tightened by adjusting the nut position along the threaded portion of the second bolt. The secured nut position at the threaded portion near the tail end of the second T-shaped bolt will allow for larger diameter scaffolding tubes or larger beams to be clamped by the second clamp. While the secured second nut position at the threaded portion near the head end of the second T-shaped bolt will allow for smaller diameter scaffolding tubes or smaller beams to be clamped by the second clamp. As shown in FIG. 11, it is appreciated that the lower surface 77 of the second clamp half may be concave so that the lower curved surface 79 of the second scaffolding tube 54 is engaging with the lower concave surface 77 of the second clamp half and the upper curved surface 81 of the second scaffolding tube 54 is engaging with the concave surface 95 of the second arm of the central X-shaped body.

Similar to the first nut recess 62 at the first clamp half, the second clamp half may have a second concave recess at the second bolt securing end of the second clamp half, in which the second concave recess may be adapted for receiving the base portion of the second nut. Preferably, the base portion 97 of the second nut 120 may be adapted to be received in the second recess 99 of the second clamp half, wherein the second recess 99 may cover the base portion 97 of the second nut.

It is preferred that the clamp, bolts and nuts are constructed from black steel and/or galvanised steel for sufficient rigidity, integrity and robustness so as to support the connection of the scaffolding tubes, when in use. To advantageously allow the user to place the first scaffolding tube in the first clamp, the pivotal movement of the first clamp half may allow movement outwardly away from the first concave recess of the central body through an angle greater than 90° for allowing placement of the first scaffolding tube or first beam transversely of the length of the first beam. Similarly, to advantageously allow the user to place the second scaffolding tube in the second clamp, the pivotal movement of the second clamp half may allow movement outwardly away from the second concave recess of the central body through an angle greater than 90° for allowing placement of the second scaffolding tube or second beam transversely of the length of the second beam.

Figure 13A:
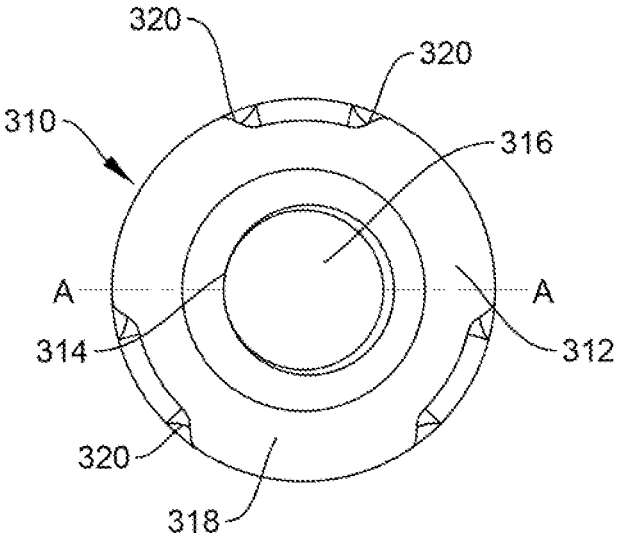
FIG. 13A depicts a top view of the nut of another preferred embodiment.
Figure 13B:
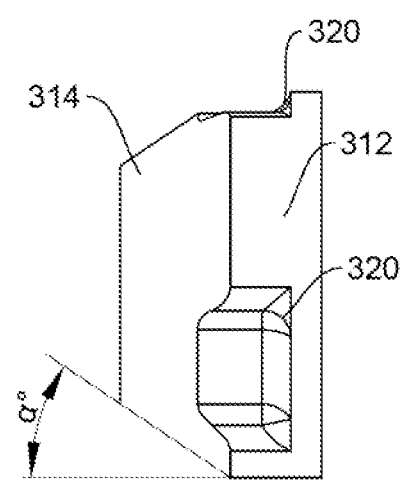
FIG. 13B depicts a side view of the nut of FIG. 13A, showing the cavities.
Figure 13C:
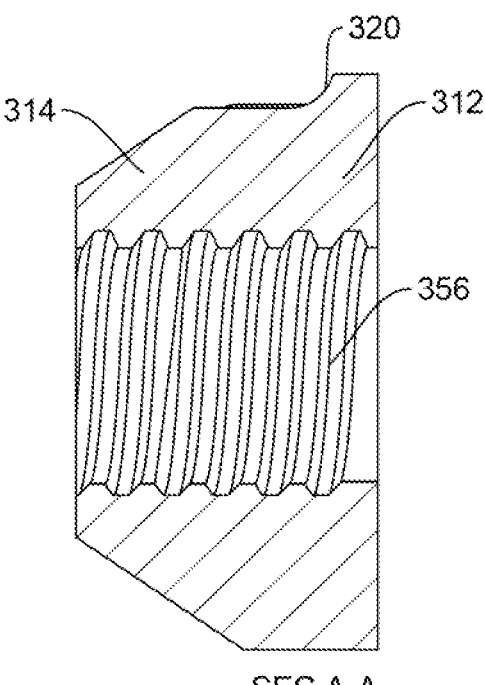
FIG. 13C depicts a side cross-sectional view of the nut of FIG. 13A at SEC-AA.
Figure 13D:
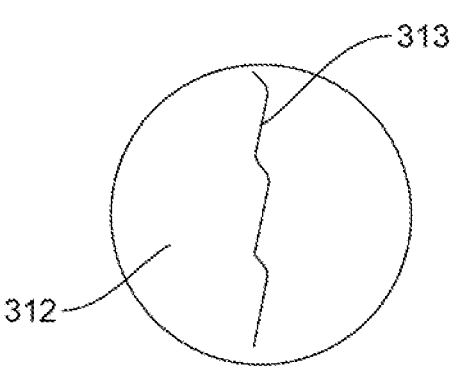
FIG. 13D depicts a bottom view of the nut of FIG. 13A, showing the teeth or textured surface.

In another preferred embodiment of the present invention, as illustrated in FIGS. 13A to 13D, FIG. 13A shows a nut 310 according to another preferred embodiment of the present invention. The nut 310 may be adapted to disengage with a threaded bolt, the nut 310 may comprise a base portion or a washer portion 312 integrally formed to a top portion 314. The base portion or a washer portion 312 may be a curved shape or a circular shape. As shown in FIG. 13D, the bottom of the base portion 312 may have teeth or a textured surface 313 for providing better grip when the nut 310 is situated on the concave recess of the clamp half.

The nut 310 may include a bore 316 positioned along a central axis through the base portion 312 and the top portion 314. The bore 316 may be a circular shape which may have a threaded portion 356, as shown in FIG. 13C, allowing for the engagement with the threaded portion of the threaded bolt. The top portion 314 may be tapered between the circumference of the base portion 312 and the bore 316 of the top portion 314. The nut 310 may be a tapered conical shape. The tapering of the top portion 314 may be substantially steep and may be at an angle, α, between 0 to 45° relative to the diameter of the base portion 312, as shown in FIG. 13B. Preferably, the angle, α, is 34°. The base portion 312 may comprise at least two cavities 320, wherein the at least two cavities 320 may extend vertically into the base portion 312, as shown in FIG. 13B. Preferably, the cavities 320 each may have a cavity wall 321 that is curved towards the bore 316, wherein the curved cavity wall is parallel to the longitudinal axis of the bore 316. The advantage of the curved cavity wall 321 is so that ordinary and common nut turning tools may not be able to receive in or engage the cavity 320 and/or grip the curved cavity wall to facilitate nut turning.

Figure 14A:
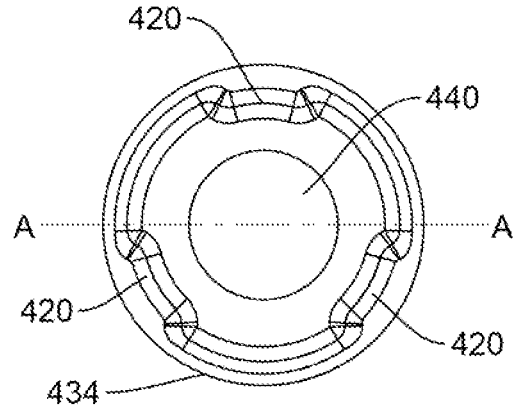
FIG. 14A depicts a top view of the head of the device showing the chamber and the positioning of the male portions for use with the nut of FIG. 13A.
Figure 14B:
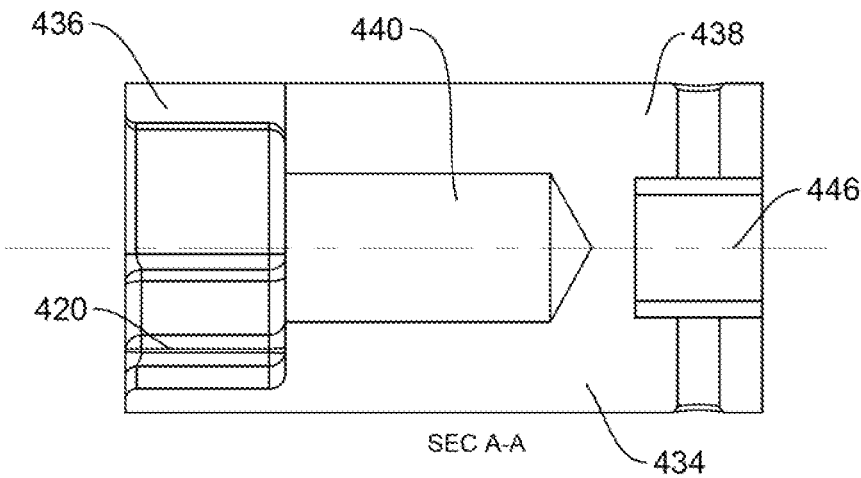
FIG. 14B depicts a side view of the head of the device when the head has been detached from the handle, in which the side view shows the chamber adapted for receiving the nut of FIG. 13A and/or the threaded bolt 60/110 as shown in FIG. 10.

Further, as shown in FIG. 13A, the tapered surface or tapered region 318 between each cavity 320 may be smooth. Preferably, the tapered surface 318 of the top portion 312 may be linear so that common tools generally used turning hex nuts may not easily grip the tapered top portion 314 for providing torque to the nut 310. The bespoke nut 310 may preferably have six cavities. It may be appreciated that the cavities 320 may be any number greater than two so that a bespoke tool, may allow a user to provide torque to the bespoke nut 310 when each of the male portions of the bespoke tool is each engaging with different cavities 320 of the nut 310, as shown in FIGS. 14A and 14B.

The bespoke nut 310 may have cavities that may be asymmetrically spaced relative to each other around the tapered top portion 214. As shown in FIG. 13A, the shape of the cavities 320 adjacent relative to each other are not the same in which the shape of the cavity 320 and the shape of the adjacent cavity 320 have a reflection symmetry with respect to the diameter of the base portion equidistant between each other. This is so that a specific tool, such as the tool as shown in FIG. 14A and FIG. 14B, can be suitably used to engage or disengage the nut 310 from the threaded bolt. This specificness of the tool to be used with the nut 310 may provide a more secure fastener assembly with the threaded bolt, in which the nut 310 may not be removed by ordinary and common nut turning tools.

This more secure bespoke nut 310 and bespoke tool fastener assembly may be adapted to be used with a clamp 50 to fasten a first clamp half 54 with a clamp body 52 as shown in FIG. 8 and FIG. 10. The first clamp half 54 may have a first threaded bolt receiving means 56 adapted to receive the threaded end 60 of the first threaded bolt 58. The first clamp half 54 may also have a concave recess 62 at the outer surface 55 of the first clamp half, the concave recess 62 may be adapted for receiving the base portion 12 of the nut 310. The concave recess 62 of the clamp half may have a depth that covers the height of the base portion 312 of the nut 310 when received. Preferably, the base portion 312 may be flush with the concave recess 62 with the tapered top portion 314 of the nut 310 exposed. The exposure of the tapered top portion 314 may allow for engagement with the bespoke tool. The tapered top portion 314 also prevents or limits the capability of the user to use other workshop tools to disengage the locking nut 310 without the use of the bespoke tool. Other workshop tools including mini-vice grips, pliers, and wrenches will not be to engage either the tapered surface or the circular rounded top profile of the locking nut 310.

Each cavity 320 of the nut 310 may each have a wall 321 that is curved towards the bore 316, wherein the curved cavity wall 321 is parallel to the longitudinal axis of the bore 316. It may be appreciated that other curved and wavy shapes can be used as long as the bespoke tool have the complementary curved or wavy shape to fit into each of the cavities of the bespoke nut 310. The bespoke nut 310 may be formed from black steel and/or galvanised steel. The shape may be keyed to mate with the corresponding extension of the bespoke tool.

The device or tool may be adapted for engaging with the nut 310. The device or tool may comprise an elongate member or head 434. The elongate member or head 434 may have a proximal end 436 and a distal end 438 and a member bore or a member chamber 440 of a sufficient length extending from the proximal end and the distal end. The member chamber 440 may be able to receive the tapered portion of the nut 310 and/or the length of T threaded bolt when in use in securing or unsecuring the nut 310 from the clamp half with the T-threaded bolt. The proximal end 436 may have at least two male portions 432 mounted on the inner surface of the member bore 440. Each of the at least two male portions 432 may extend parallel to the longitudinal axis of the elongate member up until the proximal end 436. Each of the male portions 432 may be adapted to receive in a different cavity 320 of the nut 310 and wherein the member bore 440 is adapted to receive the top portion 314 of the nut 310.

When the nut 310 is engaged with the threaded end 60 of the threaded bolt 58, the bore or chamber 440 of the device or tool may be adapted to receive the threaded end 60, when the threaded end 60 of the bolt 58 extends out from the bore 316 of the top portion 314 as the nut 310 moves towards the head 62 of the bolt 58. Preferably, the bolt may be a T-shaped bolt.

The elongate member may have a distal end 438, wherein the distal end 438 may have a pivoting means or pivotally connected to a handle, similar to the handle as shown in FIG. 1, FIG. 2, and FIG. 4. The pivotal connection may allow the handle to pivotally move between −90° to 90° with respect to the longitudinal axis of the elongate member. Although a user can impart a turning motion to the handle when it is along the longitudinal axis of the elongate member to turn the nut 310, when the tool is engaged with the nut 310; it may be ergonomically better for the user to pivotally move the handle either −90° or 90° with respect to the longitudinal axis of the elongate member 434 so that the user can use their body weight to apply torque to the nut 310.

The bespoke nut 310 and the bespoke tool with the elongate member 434 as shown in FIGS. 14A and 14B may be adapted for use with a scaffolding clamp 50 which is shown in FIG. 11. The scaffolding clamp 50 may be adapted for securing a first beam 51 and a second beam 53. The scaffolding clamp 50 may have two clamp halves. At least one half or side of the clamp may be adapted use any one of the bespoke nuts 10/210/310 of the preferred embodiment. The scaffolding clamp 50 may comprise a first arm 76 joined with a second arm 78 to form a central X-shaped body 80. The central X-shaped body 80 may have an upper surface 82 and a lower surface 84. The preferred configuration is to use any two locking nuts 10/210/310; wherein one of the nut 10/210/310 is mounted on each half of the scaffolding clamp 50. The recess for receiving the bespoke nut 10/210/310 may have a dimension such that the base portion 12/212/312 of the bespoke nut is not above the height of the recess but rather the tapered portion 14/214/314 of the bespoke nut 10/210/310 is above the height of the recess. The bespoke tool for the bespoke nut 10/210/310 is specifically used to secure or unsecure the bespoke nut 10/210/310 to the scaffolding clamp with the T-shaped bolt.

Although the invention has been described with reference to specific examples, it will be appreciated by those skilled in the art that the invention may be embodied in many other forms, in keeping with the broad principles and the spirit of the invention described herein.

The present invention and the described preferred embodiments specifically include at least one feature that is industrial applicable.

The claims defining the invention are as follows:

1. A nut adapted to disengage with a threaded bolt, the nut comprising:

a base portion integrally formed to a top portion, wherein the base portion comprises a cylindrical flange extending from a bottom surface of the nut to the top portion, wherein a diameter of the cylindrical flange is greater than a diameter of the top portion, wherein the nut includes a bore positioned along a central axis through the base portion and the top portion, wherein the top portion extends from the base portion to a top surface of the nut, wherein the top portion comprises an external tapered cylindrical surface that is externally tapered between an end of the base portion and a top surface of the nut, wherein the external tapered cylindrical surface is at an angle between 0° to 45° relative to a diameter of the base portion;

the external tapered surface comprising at least two cavities, wherein the at least two cavities extend vertically into the base portion;

wherein in use, a nut removing device respectively mates with the at least two cavities.

2. The nut according to claim 1, wherein the external tapered cylindrical surface extends between each cavity and is smooth, and wherein the external tapered cylindrical surface is linear.

3. The nut according to claim 2, wherein the base portion is adapted to be received in a first recess of a first clamp arm, wherein the base portion is configured to be covered by the first recess.

4. The nut according to claim 3, wherein the base portion is configured to be flush with the first recess.

5. The nut according to claim 4, wherein the external tapered cylindrical surface of the top portion is exposed when the base portion is received in the first recess.

6. The nut according to claim 5, wherein the profile of each cavity is a trapezoidal shape.

7. The nut according to claim 5, wherein the cavities each have a wall that is curved towards the bore, wherein the curved cavity wall is parallel to a longitudinal axis of the bore.

8. The nut according to claim 7, wherein the cavities are symmetrically dispersed with respect to the diameter of the base portion so that they are equidistant to each other.

9. The nut according to claim 8, wherein the the external tapered cylindrical surface is at an angle of 34° relative to the diameter of the base portion.

10. A nut removing device for use with the nut of claim 1, the nut removing device comprising:

an elongate member having a proximal end and a distal end and a chamber extending from the proximal end to the distal end;

the proximal end having at least two male portions mounted to a wall of the chamber, wherein each of the at least two male portions extend parallel to a longitudinal axis of the elongate member, wherein each of the male portions is adapted to be received in a respective cavity of the nut, and wherein the chamber is adapted to receive the top portion of the nut.

11. The nut removing device according to claim 10, wherein when each male portion is received in its respective cavity of the nut, the proximal end of the elongate member does not engage with the base portion of the nut.

12. The nut removing device according to claim 11, wherein the chamber of the device is adapted to receive a thread of a bolt, when the thread of the bolt extends out of the bore of the top portion as the nut moves towards a head of the bolt.

13. The nut removing device according to claim 12, wherein the distal end of the elongate member is pivotally connected to a handle, wherein the handle can pivotally move between −90° to 90° with respect to the longitudinal axis of the elongate member.

14. A scaffolding clamp adapted for securing a first and a second beam, the scaffolding clamp comprising:

a first arm joined with a second arm forming a central X-shaped body, wherein the central body has an upper surface and a lower surface;

the first arm comprising a first pivot at one end, a first bolt head retainer at the other end, and a first concave recess positioned at the upper surface between the first pivot and a first aperture, wherein the first concave recess is perpendicular to a longitudinal axis of the first arm;

the second arm comprising a second pivot at one end, a second bolt retainer at the other end, and a second concave recess positioned at the lower surface between the second pivot and a second aperture, wherein the second concave recess is perpendicular to a longitudinal axis of the second arm;

the first arm comprising a first clamp half, wherein at one end of the first clamp half is pivotally engaged with the first pivot, and a second end of the first clamp half is adapted to secure a first threaded bolt with a first nut according to claim 1;

the second arm comprising a second clamp half, wherein one end of the second clamp half is pivotally engaged with the second pivot, and a second end of the second clamp half is adapted to secure a second threaded bolt with a second nut according to claim 1, wherein the second nut is adapted to disengage with the second threaded bolt.

15. The scaffolding clamp of claim 14, wherein the first bolt head retainer comprises the first aperture positioned at an upper surface of the first arm, and a first bolt recess is positioned at a lower surface of the first arm, wherein the first aperture is adapted for receiving the first bolt, and wherein the first bolt recess is adapted for securing a head of the first bolt.

16. The scaffolding clamp of claim 15, wherein the second bolt head retainer comprises the second aperture positioned at a lower surface of the second arm, and a second bolt recess is positioned at an upper surface of the second arm, wherein the second aperture is adapted for receiving the second bolt, and wherein the second bolt recess is adapted for securing a head of the second bolt.

17. The scaffold clamp of claim 16, wherein the second end of the second clamp half has a second recess adapted for receiving a base portion of the second nut.

18. The scaffold clamp of claim 17, wherein the second recess covers the base portion of the second nut, and wherein the base portion of the second nut is flush with the second recess.

19. The scaffolding clamp according to claim 18, wherein the first pivot allows for pivotal movement of the first clamp half outwardly away from the first concave recess of the central body through an angle greater than 90° for allowing placement of the first beam transversely of a length of the first beam.

20. The scaffolding clamp according to claim 19, wherein the second pivot allows for pivotal movement of the second clamp half outwardly away from the second concave recess of the central body through an angle greater than 90° for allowing placement of the second beam transversely of a length of the second beam.

*     *     *     *     *